United States Patent Office

3,468,957
Patented Sept. 23, 1969

3,468,957
PROCESS FOR DEHYDRATING AN ALDOL
Ronald H. Wile, Bay City, Tex., assignor to Celanese Corporation, New York, N.Y., a corporation of Delaware
No Drawing. Filed Jan. 17, 1967, Ser. No. 609,787
Int. Cl. C07c 45/16
U.S. Cl. 260—603     6 Claims

ABSTRACT OF THE DISCLOSURE

In dehydrating an aldol to the corresponding unsaturated aldehyde, e.g. in dehydrating butyraldo to 2-ethylhexenal, in a liquid phase, a catalyst is employed which comprises an acid phosphate ester. In a preferred embodiment, the dehydration reaction is conducted in a reactor containing two liquid phases in intimate contact, one being an oil phase comprising the aldol and the other being an aqueous phase, with the dehydration catalyst being either an emulsifying agent or else a compound having appreciable solubility in both the oil phase and the aqueous phase. Unusually high chemical efficiency in the dehydration reaction is obtained, and fouling of process equipment by resinous deposits is also minimized.

---

This invention relates to the dehydration of aldols to the corresponding unsaturated aldehydes. More particularly it relates to an improved reaction system for said dehydration. Specifically it relates to improved dehydration catalysts the use of which results in improved chemical efficiency and in a lessening of fouling and corrosion in the process equipment employed in carrying out the dehydration reaction.

Unsaturated aldehydes have numerous uses as chemical intermediates. In particular, crotonaldehyde and 2-ethylhexenal are employed on a large scale in manufacturing n-butanol and 2-ethylhexanol by processes in which a precursor aldehyde, e.g. acetaldehyde or butyraldehyde, is aldoled as the initial step, after which the resulting aldol is dehydrated to the unsaturated aldehyde which is then hydrogenated to the final product alcohol which contains twice as many carbon atoms as the aldehyde from which it has been prepared.

In the existing art, any of several methods is employed to convert the aldol to the corresponding unsaturated aldehyde. Typically, however, the aldol is dehydrated in the presence of a mineral acid, phosphoric acid being especially useful. In a typical industrial process for converting an aldehyde having $n$ carbon atoms to an alcohol having $2n$ carbon atoms in the molecule, the aldehyde feedstock is first aldoled with an alkaline catalyst to produce an intermediate fraction comprising the aldol mixed with substantial quantities of the unreacted free aldehyde. While it is not essential, it is convenient in many instances to recover this fraction from the aldoling step in the form of an admixture with water. The alkaline aldoling catalyst may also still be present in this fraction, although it is advantageous to remove it because, in the next processing step, it will be brought into contact with an acidic catalyst. The crude aldol fraction just described is then fed to a dehydration reactor. This reactor may be operated either batch-wise or continuously, but it is advantageously operated continuously. It comprises a reaction vessel, provided with means for agitating the liquid contained therein. Suitable means for heating the liquid contents are attached to the vessel; a thermal siphon reboiler is particularly advantageous. From the upper portion of the vessel means are provided for drawing off vapors and forwarding them to a condenser, from which the condensate can be drained into a receiver adapted to the decantation separation of a two-phase condensate.

In opertion, the crude aldol fraction is fed continuously into the dehydration reactor together with an acidic dehydration catalyst, commonly in an aqueous solution. Water is also added, either as liquid or as steam, in at least sufficient quantity to form the water azeotrope of the unsaturated aldehyde which is to be formed in the dehydration reaction.

The dehydration reaction is maintained at an elevated temperature, typically 100 to 130° C., and at a pressure which is sufficient to maintain the aldol, or both aldol and some of the water, in the liquid phase at the temperature being maintained. Expressed in another way, the dehydration reactor is being operated as a still in a steam distillation; the pressure maintained therein will be the vapor pressure associated with the still temperature which is being maintained.

A vaporization rate is maintained in the reactor such as to continuously vaporize out of the liquid phase all of the aldehyde feed thereinto with the crude aldol, together with the unsaturated aldehyde which is the dehydration product. As already mentioned, the unsaturated aldehyde is advantageously stripped out of the reaction liquid in the form of its water azeotrope, so that vapors leavng the reactor contain normally at least enough water vapor to satisfy the azeotrope requirements of the unsaturated aldehyde. During operation the liquid contained in the dehydration reactor usually comprises two phases, one a water phase and the other an oil phase comprising predominantly the aldol. Operation without a water phase is possible if desired. By agitation these two phases are kept thoroughly commingled. A portion of the liquid is drawn off more or less continuously to prevent buildup of tars and other high-boiling contaminants including salts. Because of this purge, it is necessary, in order to maintain an effective catalyst concentration in the reactor, to add makeup catalyst to the reactor from time to time.

The vapors drawn off from the dehydration reactor contain (a) the unsaturated aldehyde which is the reaction product, (b) the lower molecular weight saturated aldehyde which was the feedstock for the aldol reaction and which was contained in the dehydration feedstock, (c) relatively small quantities of the aldol, and (d) water. Upon being condensed, these vapors form a condensate which separates into two liquid phases. Of these the lower phase is aqueous and contains some of the saturated aldehyde; its disposition is outside the scope of the present invention, but it advantageously is returned to the aldol reaction system or to the dehydration reactor. The upper phase comprises the unsaturated aldehyde reaction product, the saturated lower molecular weight aldehyde, and the aldol. The aldol contained in this phase, which will be designated "carry-over," is significant in understanding the operation of the present invention and will be discussed further hereinbelow.

The upper phase from the dehydrator condensate just described is then forwarded to a distillation column, in which the saturated low molecular weight aldehyde is recovered as a distillate, typically then being recycled to the aldol reactor. The unsaturated aldehyde is recovered as the high-boiling distillation product, and, unless subjected to additional and rather costly processing, contains the aldol carry-over either as such or in the form of tarry condensation products. The unsaturated aldehyde is then hydrogenated to the corresponding alcohol.

Several variations are possible, and are employed, in the above-described process, but, especially to the extent that they entail dehydration of an aldol with an acidic catalyst in the presence of water, with the product being recovered by vaporization, they are all subject to certain deficiencies. Basically, these deficiencies all stem from the use of dehydration catalysts which are mineral acids or other highly polar materials which are highly hydrophilic. Alternatively, there are also deficiencies in employing catalysts which are extremely hydrophobic. Highly hydrophobic catalysts are not commonly used, but, when they are used, promote undesirable condensation reactions within the oil phase contained in the dehydration reactor, the result being formation of undesirable resinous by-products. Highly hydrophilic catalysts, e.g. the commonly-used mineral acids, are deficient in two respects. First, they contribute to the formation of solid deposits (e.g. salts) on the tubes of the reactor reboiler. This not only decreases its heat transfer performance, but in addition promotes corrosion of its surfaces between the metal and the deposit. Additionally, unless extremely violent reactor agitation is employed, there tends to form, in a reactor in which mineral acids are being employed, an oil layer at the upper surface of the reacting liquid. This results in part from the "salting-out" action of mineral acids and salts. This layer, having very little contact with the hydrophilic catalyst, substantially all of which is within the water phase, does not take part in the dehydration reaction to any extent. Conversely, since it is hot, it constitutes a zone in which deleterious resin-forming side reactions are free to occur. Also, since it is continually being stripped by the action of vapors evolving from the liquids below it, it contributes a major portion of the aldol "carry-over" previously referred to. This carry-over is highly undesirable in that, in the distillation operation described hereinabove, it is for all practical purposes not possible to recover it and return it to the reaction system. Under the conditions of the distillation, the carry-over is in part decomposed to the lower molecular weight saturated aldehyde and in part polymerized to tars. Only that portion decomposing to low molecular weight aldehyde can be recovered at all; the tars not only are useless but in addition contaminate the final alcohol product.

In addition to the disadvantages described above, the catalysts of the existing art are also limited in activity.

It is an object of this invention to provide aldol dehydration catalysts having superior properties as compared with those of the prior art. It is another object to provide an improved process for the dehydration of aldols to the corresponding unsaturated aldehydes. Other objects of the invention will be apparent from the following detailed description and examples.

In accordance with the present invention, a process for the dehydration of an aldol to the corresponding unsaturated aldehyde is improved by employing as the dehydration catalyst phosphoric acid which has been partially esterified with an alkyl, aryl, or alkaryl hydroxy compound (also referred to as mono- or di-alkyl, aryl, or alkaryl phosphate or acid phosphate ester). Such catalysts, it has been discovered, are not only more active in promoting the dehydration reaction, particularly in reaction systems comprising an aqueous phase and an oil phase, but in addition result in a great diminution in fouling of the dehydrator and associated equipment (such as the reboiler) by tars, salts, and corrosion products. A concomitant advantage of the diminution of fouling is a diminution in corrosion of the metal surfaces. Furthermore, and of equal importance with the foregoing advantages, the use of these catalysts sharply reduces the amount of aldol carry-over in the product vapors withdrawn from the dehydration reactor.

The mechanism by which the catalysts of the invention bring about the above-described improvements is believed to be approximately as follows. It is to be understood that this theory of operation is offered merely by way of explanation and without intending to limit the invention thereto. Briefly, it is believed that the superior efficacy of these catalysts resides in the fact that they are capable of distributing themselves thoroughly throughout both liquid phases contained in the reactor, as a result of simple solution, emulsification, or both. The result is a marked increase in output of product per unit volume of reaction space. Another result, which may stem either from a solubilizing or emulsifying action of the catalyst or else from the fact that the dehydration reaction is accelerated at the expense of the competing resinification reactions, is that the deposition of tars is retarded and fouling of the metal surfaces in the reactor is greatly decreased. Another result, which is believed to be due to a dispersive action of the acid phosphate esters, is the disappearance or great diminution of the oil layer on the surface of the liquid in the reactor. (A separate oil phase may still form in a sample which is withdrawn from the reactor and allowed to settle.) Whatever the exact mechanism may be, acid phosphate esters, especially those which are emulsifying agents or which have solubility characteristics such that they are soluble in both water and aldols, are superior catalysts for dehydrating aldols on an industrial scale as compared with those of the prior art.

In practicing the invention, substantially the same dehydration reaction conditions are employed as are generally employed when aldols are dehydrated in the liquid phase with prior art catalysts such as mineral acids. Substantially the only difference, which is a matter of prudence rather than an absolute requirement, is that, alkyl phosphoric acids being much more costly than mineral acids, the aldol fraction fed into the dehydration reactor should be as free from residual alkalinity as practicable. Such alkalinity, of course, destroys the catalyst by neutralizing it, and additional catalyst is therefore required in order to maintain the desired level of active catalyst. The same consideration applies when mineral acids are employed, of course, but at a lower level of cost. A particularly advantageous and inexpensive method for removing substantially all of the alkali content of the product of an aldol reactor is to cool it to a temperature at which it separates into two liquid phases, of which the lower (aqueous) phase contains substantially all the alkaline aldol catalyst and very little of the organic aldol products. By simple decantation an aldol fraction is obtained which is entirely suitable as aldol feedstock for the practice of the present invention. This method for removing alkalinity from an aldol product is described in my co-pending patent application Ser. No. 536,295, filed Mar. 23, 1966.

The temperature of the dehydration reactor should be maintained in the range of 100° C. to 130° C., preferably 122° C. to 127° C. The pressure should be high enough to maintain substantially all of the aldol and the dehydration catalyst in the liquid phase, but low enough to allow efficient vaporization of the unsaturated aldehyde product and the saturated aldehyde precursor of the aldol out of the reactor. Specifically, a pressure between 50 p.s.i.a. and 60 p.s.i.a. is recommended in the dehydration of acetaldol. A pressure between 25 p.s.i.a. and 35 p.s.i.a. is recommended in dehydrating butyraldol. The concentration of the alkyl phosphoric acid dehydration catalyst can be varied over a wide range, but it is advantageously between about 2 and 2.5 mole percent, based on the total liquid content of the dehydration reactor. Preferably it is 2.2 to 2.5 mole percent, the lower figure being applicable at dehydration temperatures around 125° C. and the upper figure being applicable at temperatures around 130° C.

The liquid contained in the dehydration reactor can be substantially anhydrous, with the vaporization of unsaturated aldehyde therefrom being assisted by the injection of live steam into the reactor. Advantageously, however, there are maintained in the reactor both an organic phase, comprising predominantly the aldol, and an aqueous phase. Typically, of the total liquid contents of the reactor, about 20 mole percent or 48 wt. percent is organic phase and 80 mole percent or 52 wt. percent is aqueous phase.

The catalysts of the invention, as has been stated above, include both monoesters and diesters of phosphoric acid.

Triesters can also be employed if, under the conditions existing in the aldol reactor, they are subject to hydrolysis whereby one or two of the esterified alcohol moieties are replaced by hydrogen; it should be kept in mind, however, that the liberated free alcohol may, to some degree, form acetals with the aldehyde moieties which are present. Generically, the catalysts of the invention are represented by the formula:

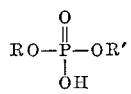

wherein R is any alkyl, aryl, or alkaryl radical having from 3 to 8 carbon atoms and R′ is either hydrogen or an alkyl, aryl, or alkaryl radical having from 3 to 8 carbon atoms. R and R′ may be either the same or different radicals, and may be normal, branched, or cyclic. The use of acid phosphate esters having substituents on the alcohol groups is also within the scope of the invention, provided the substituted compound is stable under the conditions existing in the dehydration reactor, and also provided that the compound in question is acidic and either has emulsifying properties or is of appreciable solubility in both water and the aldol being dehydrated. However, simple alkyl phosphoric acids are readily available, effective, and relatively inexpensive and are preferred.

Butyl phosphoric acids, both monobutyl and dibutyl, are particularly effective. Either can be used alone, but it is believed that the particularly advantageous properties of the mixture are due to the fact that monobutyl phosphate is preferentially soluble in water while dibutyl phosphate is preferentially soluble in organic compounds. Thus, by employing a mixture of these two phosphates, an effective concentration of dehydration catalysts is attained throughout the dehydration reactor in both water and oil phases. An additional advantage of employing butyl phosphates is that they are readily procurable or can be easily manufactured. Secondary-butyl and branched-chain butyl phosphates are equally efficacious. Higher alkyl phosphates are also effective, including mono- and di-hexyl and octyl phosphates, either normal, branched, or cyclic. Alkyl phosphates higher than octyl, while still useable, tend to become less effective with increasing molecular weight of the alkyl groups, because of their increasing perferential oil solubility. Mono- and diphenyl phosphates can be employed, as well as cyclohexyl, tolyl, and benzyl acid phosphates.

The following example illustrates the dehydration of n-butyraldol with phosphoric acid catalyst, and typifies the prior art.

EXAMPLE I

An aldol fraction comprising 7,050 pounds per hour of butyraldehyde, 7,050 pounds per hour of butyraldol, and 450 pounds per hour of water, substantially free of excess alkalinity, was fed continuously to a dehydrator, which was a vertical vessel 6 feet in diameter and 12 feet high, operated at 120° C. and 26.7 p.s.i.a. pressure. The liquid inventory maintained in the dehydrator was 2000 gallons. Phosphoric acid, as a 40% aqueous solution, was continuously added to the dehydrator in an amount of 14.6 pounds per hour of contained phosphoric acid. Also added continuously to the dehydrator was 20,750 pounds per hour of water, for the purpose of distilling out of the reactor the 2-ethylhexenal dehydration product as its water azeotrope. By applying heat to the reboiler, 2-ethylhexenal was continuously vaporized out of the dehydrator at a rate of 6,000 pounds per hour together with 22,000 pounds per hour of water vapor. Also contained in this vapor stream were 150 pounds per hour of butyraldol "carry-over" together with substantially all of the butyraldehyde fed with the aldol fraction, i.e. about 7,000 pounds per hour. In order to avoid buildup of resinous by-products in the dehydrator, a continuous liquid purge of 36.5 pounds per hour was drawn off therefrom. This contained about 15 pounds per hour of phosphoric acid, 20 pounds per hour of water, and approximately 0.6 to 1.0 pound per hour of useful materials such as 2-ethylhexenal.

Of the butyraldol fed to the dehydration reactor, 97.5% was recovered as 2-ethylhexenal in the vapors drawn off from the dehydration reactor. The "carry-over," which, as described previously, is mostly lost in subsequent processing, amounted to 2.5% of the butyraldol fed to the reactor.

EXAMPLE II

Employing the same dehydration reactor described in Example I, operating essentially in the same manner as described in Example I, an aldol fraction comprising 7,050 pounds per hour of butyraldehyde, 7,050 pounds per hour of butyraldol, and 450 pounds per hour of water was fed continuously to the reactor along with 20,750 pounds per hour of additional water and 20 pounds per hour of a catalyst comprising 8 pounds per hour of monobutyl phosphoric acid and 12 pounds per hour of dibutyl phosphoric acid. The dehydrator was operated at 125° C. and 30 p.s.i.a. The vapor withdrawn from the dehydrator contained 6,100 pounds per hour of 2-ethylhexenal, 7,050 pounds per hour of butyraldehyde, 22,000 pounds per hour of water, and 50 pounds per hour of butyraldol "carry-over." The liquid purge drawn off from the dehydrator amounted to 100 pounds per hour, and contained 0.6 to 1.0 pound per hour of useful organic compounds such as 2-ethylhexenal.

Of the butyraldol fed to the dehydration reactor, 99% was recovered as 2-ethylhexenal in the product vapors and only 1.0% was lost as "carry-over" in the vapors. The surfaces of the reboiler tubes were almost completely free of fouling after six months of operation, whereas, when operating as in Example I, heavy fouling was observed after three months starting with clean surfaces. In addition, upon condensing the product vapors recovered from the dehydrator, decanting the resulting oil phase, and distilling it to separate butyraldehyde from 2-ethylhexenal, the resulting 2-ethylhexenal cut contained a much smaller content of high-boiling impurities as compared with the same material when produced by the operation described in Example I.

The evolution of vapor from the dehydrator proceeded with much less "surging" of the reboiler as compared with Example I, and fouling of the dehydrator purge line, pronounced when operating as in Example I, ceased.

EXAMPLE III

To a dehydration reactor operating at 118° C. and 60 p.s.i.a., equipped with a reboiler as described in the preceding examples and having a contained liquid inventory of 3,800 gallons, there was fed a crude mixture comprising 13,000 pounds per hour of acetaldol, 30,400 pounds per hour of acetaldehyde, 220 pounds per hour of water, and 12 pounds per hour of sodium hydroxide. This mixture had not been treated to remove the alkaline catalyst contained in it as a result of the employment of sodium hydroxide as an aldol catalyst in the preceding aldoling step. With this aldol mixture there was fed to the dehydration reactor 11,000 pounds per hour of water and 99 pounds per hour of phosphoric acid in 20% aqueous solution. Also fed to the reactor were 2.5 pounds per hour of monobutyl phosphate and 3.5 pounds per hour of dibutyl phosphate. There was continuously drawn off from the reactor a vapor product comprising 30,400 pounds per hour of acetaldehyde, 10,000 pounds per hour of crotonaldehyde, 50 pounds per hour of acetaldol, and 13,000 pounds per hour of water. A liquid drawoff was taken from thereactor comprising 50 pounds per hour of phosphoric acid, 52 pounds per hour of sodium phosphate, 5 pounds per hour of monobutyl and dibutyl phosphates, and 4 pounds per hour of useful organic products, including acetaldol.

In this instance, the alkyl phosphates were used as catalysts in admixture with phosphoric acid because of the presence in the feedstock of substantial quantities of alkali, resulting in a high consumption of the acid dehydration catalyst. By including some alkyl phosphoric acid in the catalyst, however, the benefits of the invention were still obtained. That is, aldol carry-over was reduced as compared with the amount observed when using phosphoric acid alone as the catalyst, and fouling of the dehydrator reboiler tube surfaces was greatly reduced.

EXAMPLE IV

Operating the dehydrator essentially as in Example II above, and feeding a propionaldehyde-propionaldol fraction which has been substantially freed from alkali by cooling and decantation, the mixed butyl phosphate dehydration catalyst of Example II is employed, substantially as in Example II, to dehydrate the propionaldol to the corresponding unsaturated aldehyde in improved efficiency as compared with employing phosphoric acid as the dehydration catalyst.

EXAMPLE V

Operating the dehydration reactor as in Example II but employing as dehydration catalyst mono - 2 - ethylhexyl phosphate in an amount of 0.025 pound per pound of aldol feedstock, good yields of 2-ethylhexenal are obtained, and the dehydrator reboiler remains substantially free from fouling during an extended period of operation.

The embodiments of the invention in which an exclusive property or privilege is claimed are defined as follows:

1. In a process for dehydrating an aldol to the corresponding unsaturated aldehyde, the improvement which comprises:
dehydrating said aldol in the liquid phase at a temperature between about 100° C. and 130° C. in the presence of a catalyst consisting essentially of an ester selected from the group consisting of esters formed by replacing at least one, and not more than two, of the hydrogen atoms of ortho-phosphoric acid with a substituent selected from the group consisting of aryl, alkyl, and alkaryl radicals having from three to eight carbon atoms.

2. The improved process of claim 1 wherein two liquid phases are present, one being an oil phase comprising the aldol and the other being an aqueous phase.

3. The improved process of claim 1 wherein the catalyst is at least one compound of the formula:

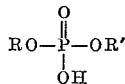

wherein R is selected from the group consisting of alkyl, aryl, and alkaryl radicals having from 3 to 8 carbon atoms and R' is selected from the group consisting of hydrogen and alkyl, aryl, and alkaryl radicals having from 3 to 8 carbon atoms.

4. The improved process of claim 3 wherein the aldol is one of the group consisting of acetaldol, propionaldol, and butyraldol.

5. The improved process of claim 4 wherein the catalyst is at least one of the group consisting of monobutyl phosphoric acid and dibutyl phosphoric acid.

6. The improved process of claim 5 wherein the catalyst is a mixture of monobutyl phosphoric acid and dibutyl phosphoric acid.

References Cited

UNITED STATES PATENTS 2,220,430  11/1940  Stanley _____ 260—682
2,042,224  5/1936  Groll et al. _____ 260—603

FOREIGN PATENTS 686,045  1/1953  Great Britain.

LEON ZITVER, Primary Examiner
R. H. LILES, Assistant Examiner

PO-1050
(5/69)

UNITED STATES PATENT OFFICE
CERTIFICATE OF CORRECTION

Patent No. 3,468,957  Dated September 23, 1969

Inventor(s) Ronald H. Wile

It is certified that error appears in the above-identified patent and that said Letters Patent are hereby corrected as shown below:

Column 5, Line 30, after "it", insert - - has been found particularly advantageous to employ a mixture of the two. It - -

SIGNED AND
SEALED
FEB 24 1970

(SEAL)
Attest:

Edward M. Fletcher, Jr.
Attesting Officer

WILLIAM E. SCHUYLER, JR.
Commissioner of Patents